United States Patent
Lorengo

(10) Patent No.: US 9,457,481 B2
(45) Date of Patent: Oct. 4, 2016

(54) BALANCED PNEUMATIC MANIPULATOR

(71) Applicant: DALMEC S.P.A., Cles (Trento) (IT)

(72) Inventor: Giovanni Lorengo, Trento (IT)

(73) Assignee: DALMEC S.P.A., (Cles) Trento (IT)

( * ) Notice: Subject to any disclaimer, the term of this patent is extended or adjusted under 35 U.S.C. 154(b) by 0 days.

(21) Appl. No.: 14/350,964

(22) PCT Filed: May 10, 2013

(86) PCT No.: PCT/IB2013/053791
§ 371 (c)(1),
(2) Date: Apr. 10, 2014

(87) PCT Pub. No.: WO2013/168130
PCT Pub. Date: Nov. 14, 2013

(65) Prior Publication Data
US 2014/0251057 A1    Sep. 11, 2014

(30) Foreign Application Priority Data

May 11, 2012 (IT) ............................ TO2012A0425

(51) Int. Cl.
| | | |
|---|---|---|
| B25J 17/00 | (2006.01) | |
| B25J 18/00 | (2006.01) | |
| B25J 13/00 | (2006.01) | |
| B25J 19/00 | (2006.01) | |

(52) U.S. Cl.
CPC ............... *B25J 18/00* (2013.01); *B25J 13/00* (2013.01); *B25J 19/00* (2013.01); *Y10S 901/22* (2013.01); *Y10T 74/20329* (2015.01)

(58) Field of Classification Search
CPC ........... B25J 18/00; B25J 13/00; B25J 19/00
USPC ......... 74/490.05, 490.06; 901/19, 22, 29, 30
See application file for complete search history.

(56) References Cited

U.S. PATENT DOCUMENTS

| | | | | | |
|---|---|---|---|---|---|
| 4,024,961 | A | * | 5/1977 | Stolpe | 414/729 |
| 4,565,487 | A | * | 1/1986 | Kroczynski | 414/730 |
| 4,662,813 | A | * | 5/1987 | Hartman | 414/718 |
| 4,899,644 | A | * | 2/1990 | Susnjara | 92/18 |
| 5,901,613 | A | * | 5/1999 | Forslund | 74/490.03 |

(Continued)

FOREIGN PATENT DOCUMENTS

| | | |
|---|---|---|
| CN | 201220417 Y | 4/2009 |
| CN | 101234486 B | 9/2010 |

(Continued)

OTHER PUBLICATIONS

International Search Report and Written Opinion.

*Primary Examiner* — William Kelleher
*Assistant Examiner* — Zakaria Elahmadi
(74) *Attorney, Agent, or Firm* — Tarter Krinsky & Drogin

(57) ABSTRACT

The manipulator comprises a supporting device (11) having an assembly (13) rotatable about a vertical axis and an articulated parallelogram (21) with a swing arm (24). A pneumatic linear actuator (22), acts between the rotatable assembly (13) and the articulated parallelogram (21), for causing the arm (24) to rotate about a horizontal axis of oscillation. A slide (23) is connected to the actuator (22) and slidably mounted on the rotatable assembly (13) by means of a first vertical guide (30). The slide has a second horizontal guide (31) in which is engaged an element (32, 33) mounted on the swing arm (24).

6 Claims, 3 Drawing Sheets

(56) References Cited

U.S. PATENT DOCUMENTS

| | | | |
|---|---|---|---|
| 6,748,819 B2* | 6/2004 | Maeguchi et al. | 74/490.01 |
| 6,848,333 B2* | 2/2005 | Lundstrom et al. | 74/490.05 |
| 7,464,623 B2* | 12/2008 | Okada et al. | 74/490.05 |
| 8,079,284 B2* | 12/2011 | Reiss | 74/490.05 |
| 8,091,448 B2* | 1/2012 | Kim et al. | 74/490.05 |
| 2009/0114053 A1* | 5/2009 | Mikaelsson et al. | 74/490.05 |
| 2010/0331857 A1* | 12/2010 | Doyle et al. | 606/130 |
| 2014/0026705 A1* | 1/2014 | Sasaki et al. | 74/490.05 |

FOREIGN PATENT DOCUMENTS

| | | |
|---|---|---|
| JP | 60259391 A | 12/1985 |
| JP | 7285092 A | 10/1995 |

* cited by examiner

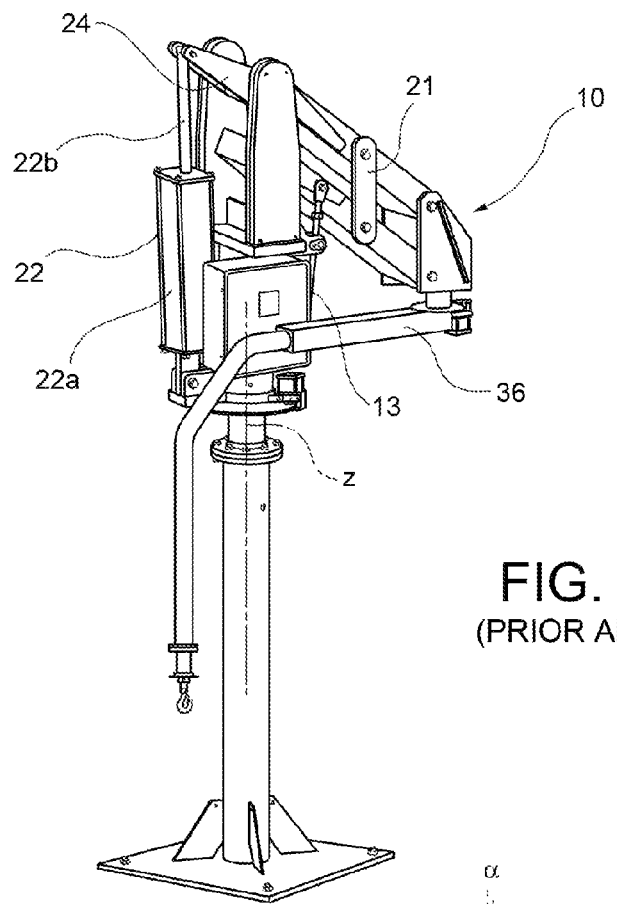
FIG. 1
(PRIOR ART)
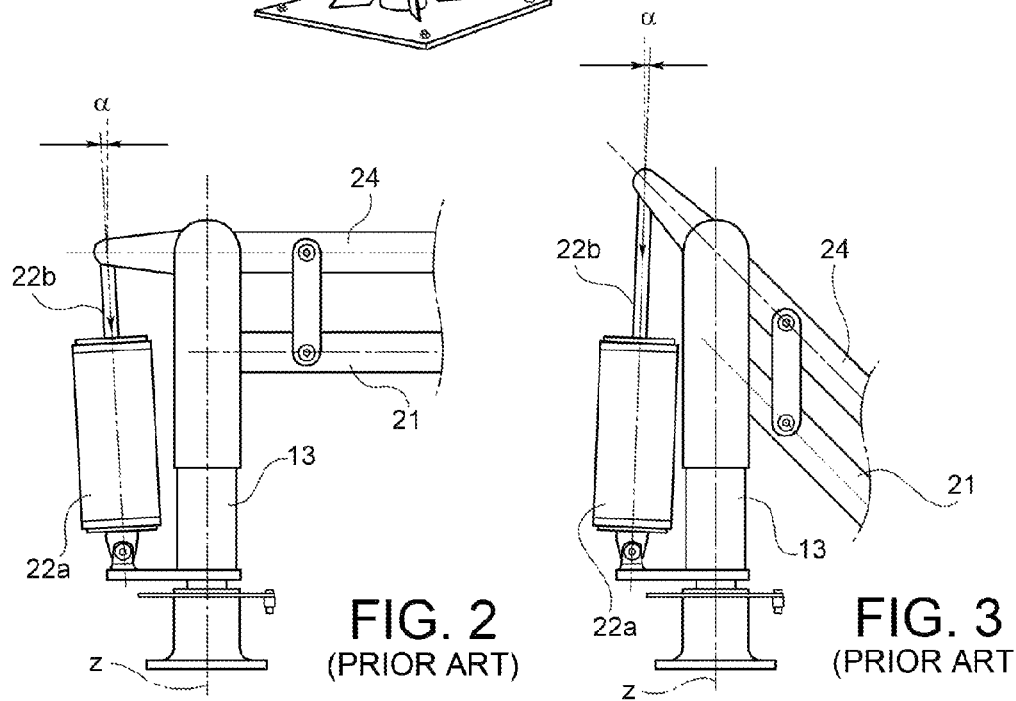
FIG. 2
(PRIOR ART)
FIG. 3
(PRIOR ART)

BALANCED PNEUMATIC MANIPULATOR

The present invention relates to a balanced pneumatic manipulator.

Manipulators of this type are widely used in manufacturing industry for supporting and moving, in a balanced condition, various tools and devices, typically including gripping devices, welding machines, screwdrivers and others, which require a minimum of manual effort by the user.

Over the years, technological progress has resulted in a continuous improvement in the sensitivity of these types of manipulator, which have been subject to problems of non-constant balancing when faced with increasing demands in terms of the loads to be handled.

To assist the understanding of the prior art and its inherent problems, a balanced pneumatic manipulator of the conventional type will be at first described, with reference to FIGS. 1 to 3. A balanced pneumatic manipulator 10 comprises a support device which includes an assembly 13 rotatable about a vertical axis z and an articulated parallelogram mechanism 21, including a swing arm 24 pivoted on the rotatable assembly 13 about a horizontal axis of oscillation. The balancing action is provided by a pneumatic linear actuator 22 which includes a cylinder 22a pivoted on the rotatable assembly 13 and a rod 22b pivoted on the swing arm 24. A rotatable horizontal arm 36, supporting a tool such as a screwdriver, a welding machine, a gripping device, or other tool, is mounted on the articulated parallelogram mechanism.

The aforesaid configuration suffers from a drawback in that the different inclinations assumed by the actuator in its different operating positions cause the transmission of forces having a horizontal component which increases with the deviation a of the line of action of the actuator with respect to a vertical axis. Very small angular deviations, of the order of a few sexagesimal degrees, have negative repercussions on balancing, and require a manual effort for movement which increases with the extent of the angular deviation of the actuator from the vertical. The manual effort required thus increases from an optimal value of the order of 20-30 N to 100-150 N or more, when the angular deviation from the vertical is maximal. In these conditions, the supported load becomes unstable and fatiguing to handle, with adverse effects on the safety and accuracy of movement.

The object of the present invention is to provide a balanced pneumatic manipulator which can overcome the aforesaid problems. In particular, it is desirable to provide a manipulator requiring a constant minimal manual effort, independently of the extension of the pneumatic actuator.

This and other objects and advantages, which will be made clearer below, are achieved according to the invention by a balanced pneumatic manipulator having the features defined in claim 1. Preferred embodiments are defined in the dependent claims.

Features and advantages of the invention will become clear from the following detailed description which is given purely by way of non-limiting example with reference to the attached drawings, in which:

FIG. 1 is a perspective view of a balanced manipulator of a known type;

FIGS. 2 and 3 are partial schematic views illustrating the different angular positions assumed by a pneumatic actuator in a balancer of the known type shown in FIG. 1;

Figure 4:
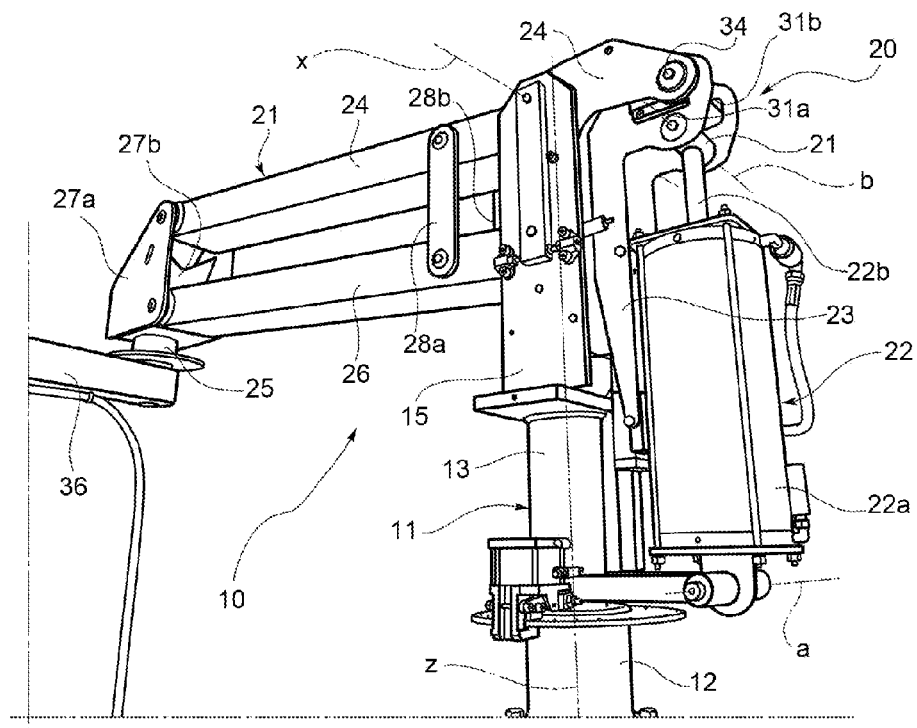
FIG. 4 is a partial perspective view of a balanced pneumatic manipulator according to an embodiment of the present invention.

With reference to FIG. 4, a manipulator indicated as a whole by numeral 10 comprises a support device 11 on which a balancing device 20 is mounted. The support device 11 defines a vertical geometric axis z, and, in this example, comprises a fixed lower vertical column 12 and an upper assembly 13 which is rotatable about the vertical axis z. The lower column 12 may be integral with a base (not shown) which can be fastened to a floor or to a movable support surface (not shown). In other applications, the support device may form part of a suspended structure, for example a structure suspended from a carriage which can run along tracks. In these other applications, the rotatable assembly 13 is placed below an upper non-rotatable part. In the following text, terms and expressions indicating positions and orientations such as "upper" and "lower" are to be construed with reference to the illustrated example, but are not to be considered as limiting.

In the embodiment shown in FIG. 4, the rotatable assembly 13 has a pair of vertical uprights 15 (only one of which is visible), which are parallel and equally spaced about the vertical axis z.

The balancing device 20 is mounted on the rotatable assembly 13 and comprises an articulated parallelogram mechanism 21, a pneumatic linear actuator 22 and a slide 23 mounted slidably on the rotatable assembly 13 of the support device.

Figure 5:
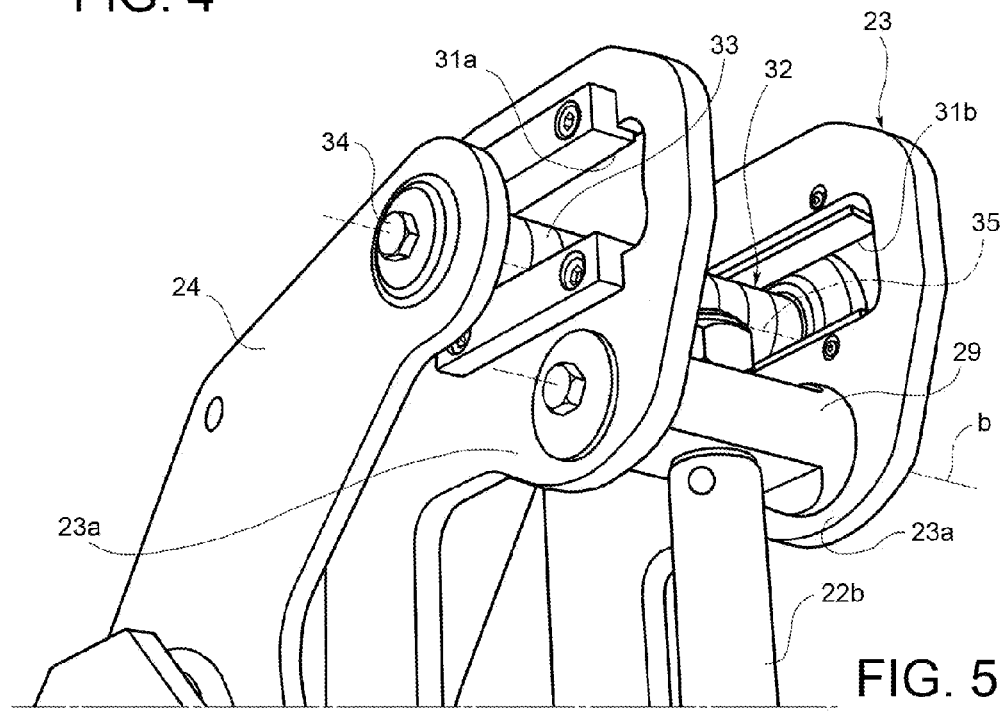
FIG. 5 is an enlarged view of a detail of the manipulator of FIG. 4.
Figure 6:
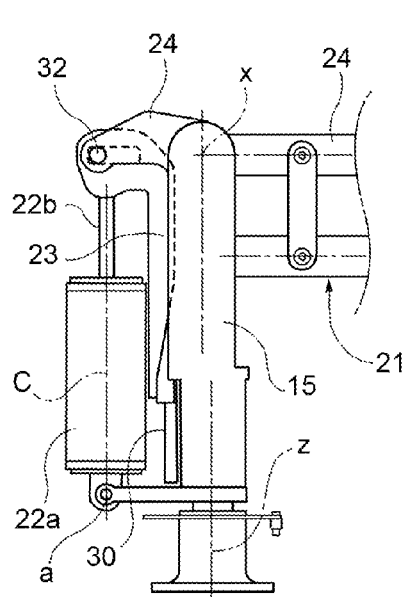
FIGS. 6 and 7 are partial schematic views illustrating two different positions assumed by a pneumatic actuator in the balancer of FIG. 4.
Figure 7:
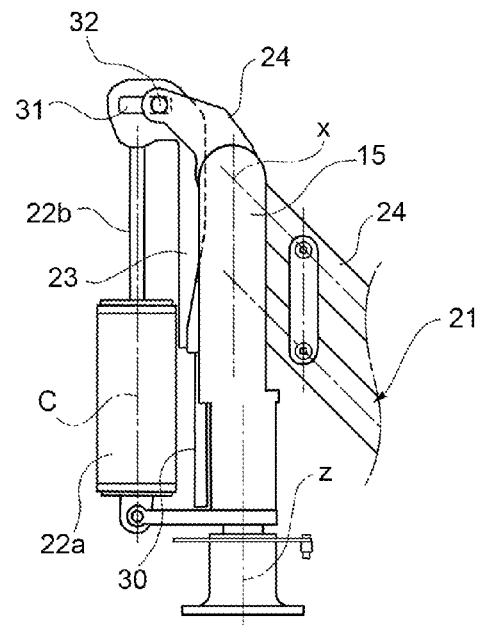

In the upper part of the uprights 15, an upper swing arm 24 forming part of the articulated parallelogram mechanism 21 is pivoted about a horizontal axis of oscillation x (also indicated in FIGS. 6 and 7). The pneumatic actuator acts between a lower connecting axis a, integral with the rotatable assembly 13, and an upper connecting axis b defined by the slide 23. Preferably, the actuator 22 is a single-acting pneumatic actuator with a cylinder 22a, in a lower position in this example, and an upper extensible rod 22b. More particularly, in the illustrated embodiment, the cylinder of the actuator is connected to the lower connecting axis, while the rod 22b is connected to the upper connecting axis b. The letter c indicates (FIGS. 6 and 7) the line of action of the actuator, which in this example is substantially vertical and parallel to the axis z. In FIGS. 4 and 5, numeral 29 indicates a spindle fixed to the head of the rod 22b and pivoted on the slide 23 about the horizontal axis b.

At the opposite end of the swing arm 24 and of the articulated parallelogram 21 there is mounted, in a known way, a vertical spindle 25 about which a horizontal arm 36 can rotate.

This arm may serve to support various devices, such as gripping tools, screwdrivers, welding machines, and others.

The articulated parallelogram mechanism 21 comprises, in addition to the upper swing arm 24, a second, lower swing arm or lever 26, which is parallel to the upper arm 24 and has its ends (not shown) hinged on the uprights 15. Two vertical connecting plates 27a, 27b, which are parallel to each other, are hinged on the reaction end of the mechanism where the vertical spindle is mounted. Two further intermediate connecting links 28a, 28b are hinged on the upper and lower swing arms in a known way. The parallelogram mechanism does not differ appreciably from the known type, and therefore will not be described in greater detail herein.

As explained above, the linear actuator 22 acts between the rotatable assembly 13 and the parallelogram mechanism 21, for causing the arm 24 to rotate about the horizontal axis of oscillation x, in order to raise and lower, in rotary translational movements, the vertical spindle 25 supported at the end of the parallelogram mechanism opposite the end near which the actuator 22 is mounted. The actuator 22 does not act directly on the arm 24, but acts via the slide 23.

The slide 23 is slidable along a first linear guide which is indicated schematically by 30 in FIGS. 6 and 7, and which is integral with the rotatable assembly 13 and parallel to the line of action c of the actuator 22. To improve the balance and load distribution, the first guide 30 preferably includes a pair of parallel linear guides (or "support" guides) which extend parallel to the line of action c of the actuator.

The slide 23 has a second linear guide 31, preferably composed of a second pair of parallel rectilinear guides 31*a*, 31*b* which are orientated perpendicularly to the first support guide or pair of support guides 30. A movable element 32 mounted on the end of the upper swing arm 24 nearer the actuator 22 is engaged along the second pair of guides 31*a*, 31*b*. Preferably, the second guides 31*a*, 31*b* of the slide take the form of a pair of parallel slots, and the movable element 32 comprises a cylindrical roller 33 which is mounted in a free-running way about a horizontal axis (shown in broken lines and indicated by 35 in FIG. 7) fixed in the position 34 at the end of the upper swing arm 24. In this embodiment, the cylindrical roller 33 is mounted by means of a pair of rolling bearings (not shown in detail) spaced apart along the horizontal axis 37, each composed of a respective outer fixed ring fastened to the arm 24 and a respective inner rotatable ring locked at one of the two opposite ends of the roller 33.

The cylindrical roller 33 is preferably housed with a predetermined minimal vertical clearance in the second guide 31 (or in the parallel second guides 31*a*, 31*b*). A clearance of the order of a few tenths of a millimeter allows the cylindrical roller to roll along the second guides 31*a*, 31*b* when the actuator 22 is extended or retracted in its movement between the alternative positions shown schematically in FIGS. 6 and 7. The rolling contact between the movable element 32 and the second guides 31*a*, 31*b* minimizes the friction between the slide and the actuator.

In an alternative embodiment (not shown), the movable engagement element 32 may comprise a block which is engaged in a sliding manner, instead of a rolling manner, in the second guide or guides 31 provided in the slide 23. For this purpose, the guide (or guides) 31 may have a shape different from that of one or two slots, depending on the shape of the block (or blocks). The choice of the slotted shape is advantageous in that it provides an optimal exchange of forces between the slide 23 and the arm 24, and produces a reliable coupling between these two members, making use of the structural strength provided by two openings formed in the arm 24.

As shown schematically in FIG. 7, the end of the swing arm 24 may be double, providing two parallel vertical plate formations 24*a*, 24*b*, thus making it possible to obtain an effective mounting of the movable engagement element 32. The slide 23, in the embodiment illustrated in FIG. 7, also includes a pair of parallel metal plates 23*a*, 23*b*, spaced apart in a horizontal direction, in each of which one of the two second guides for the cylindrical roller 33 (or for a slidable block) is formed. According to an embodiment, which optimizes the available space and the connections between the actuator and the upper assembly, each of the plates of the slide is substantially L-shaped, a straight or longer portion of this L-shape being coupled to the first linear guide 30, while a shorter portion of the L-shape has the slot or second guide 31. For the production of the first linear guide 30, the use of a recirculating ball slide is particularly preferable.

FIGS. 6 and 7 show schematically two opposite alternative positions assumed by the manipulator. The extension of the actuator results in a movement from the position of FIG. 6 to that of FIG. 7, causing the movement of the slide 23 along the first guide 30 and the simultaneous movement of the movable engagement element 32 along the second guide 31 of the slide.

Because of the slide, interposed between the actuator and the swing arm, and the mutual perpendicularity of the guides 30 and 31, the actuator transmits an exclusively vertical force, in other words a force without horizontal components, to the parallelogram mechanism. This ensures the constant balancing of the manipulator in all the ranges of excursion of the actuator, requiring the operator to use constant minimal manual effort during the operation, thus favouring the accurate use of the tool combined with the manipulator. Furthermore, the manipulator has particularly stable behaviour, enabling the operator to temporarily remove both hands from the manipulator, which remains stationary in the position that it has reached, which is advantageous in terms of safety and ease of use.

Figure 8:
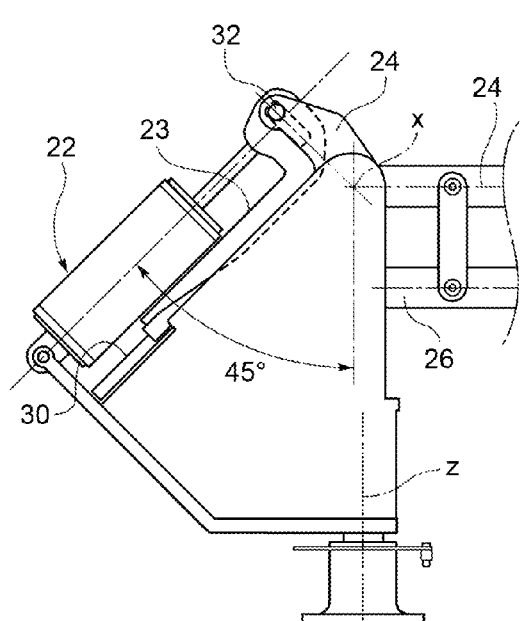
FIGS. 8 and 9 are partial schematic views illustrating two different positions assumed by a pneumatic actuator mounted according to a further embodiment of the invention.
Figure 9:
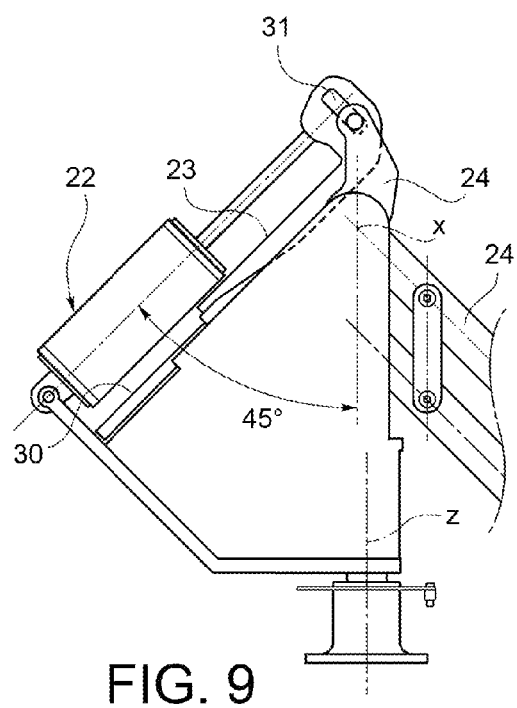

It is to be understood that the invention is not limited to the embodiments described and illustrated herein, which are to be considered as examples of embodiment of the manipulator; in fact, the invention can be modified in respect of the shape and arrangements of parts and details of its construction and operation. For example, as shown in FIGS. 8 and 9, in another embodiment of the manipulator, the line of action c of the actuator 22 can be inclined with respect to the vertical, for example at an angle of 45°. Consequently, the first guide 30 is inclined parallel to the line c, and the second guide 31 is perpendicular to the latter. Furthermore, the manipulator may be provided with two pneumatic actuators instead of a single actuator. For example, two pneumatic linear actuators can be mounted parallel to each other, one beside the other, with the respective cylinders mounted on the rotatable assembly 13 along the axis a and the respective rods integral with the spindle 29 or with extensions of the latter on the two opposite sides of the oscillating arm 24.

The invention claimed is:

1. A balanced pneumatic manipulator, including:
   a supporting device including an assembly rotatable about a vertical axis (z);
   an articulated parallelogram mechanism including a swing arm pivoted to the assembly for rotation about a horizontal axis of oscillation;
   at least one pneumatic linear actuator, acting between the rotatable assembly and the articulated parallelogram mechanism, for causing the arm to rotate about the axis of oscillation (x);
   wherein the manipulator further comprises:
   a slide connected to the actuator and slidably mounted on the rotatable assembly by means of first rectilinear guiding means extended in a first given direction (c);
   second rectilinear guiding means, integral with the slide and extending in a second direction perpendicular to the first direction; and
   an engagement element, mounted on the swing arm, the element engaging the second guiding means; the engagement element comprising a roller means which is rotatably mounted about an axis integral with the swing arm and which rolls along the second rectilinear guiding means of the slide; the second guiding means comprising a pair of parallel slots spaced from one another in a direction perpendicular to the second direction and the roller means comprising a cylindrical roller rolling in both slots.

2. The manipulator of claim 1, wherein the second guiding means comprise at least one slot.

3. The manipulator of claim 2, wherein the second guiding means comprise a pair of parallel slots spaced from one another in a direction perpendicular to the second direction.

4. The manipulator of claim 3, wherein the roller means comprises a cylindrical roller rolling in both slots.

5. The manipulator of claim 1, wherein the first guiding means extend in a vertical direction, and the second guiding means extend in a horizontal direction.

6. The manipulator of claim 1, wherein the slide comprises at least one rigid L-shaped element, with a longer section coupled to the first guide means and a shorter section which is perpendicular to the longer section and provides the second guiding means.

* * * * *